United States Patent [19]
Nakata

[11] Patent Number: 4,631,406
[45] Date of Patent: Dec. 23, 1986

[54] INFRARED RAY DETECTOR
[75] Inventor: Takeshi Nakata, Shiga, Japan
[73] Assignee: Sanyo Electric Co., Ltd., Japan
[21] Appl. No.: 667,542
[22] Filed: Nov. 2, 1984
[30] Foreign Application Priority Data
Nov. 18, 1983 [JP] Japan .................................. 58-218235
[51] Int. Cl.⁴ ............................................... G01J 1/00
[52] U.S. Cl. ...................................... 250/338; 250/351
[58] Field of Search ............. 250/338 R, 338 PY, 350, 250/351, 342, 347, 349

[56] References Cited
U.S. PATENT DOCUMENTS

| 3,925,668 | 12/1975 | Anderson et al. | 250/351 |
| 4,233,512 | 11/1980 | Rupert | 250/351 |
| 4,485,305 | 11/1984 | Kuwano et al. | 250/338 |

Primary Examiner—Janice A. Howell
Attorney, Agent, or Firm—Darby & Darby

[57] ABSTRACT

An infrared ray detector comprises an infrared ray detecting member (25), a pair of opposing members (32, 33) each having a plurality of infrared ray transmitting portions (34, 35) and infrared ray non-transmitting portions (36, 37), a pair of vibrators (38, 39) and a driving signal supplying circuit (59, 60). The pair of opposing members (32, 33) are disposed in the area of incidence of infrared rays to the infrared ray detecting member (25), and are displaced periodically by the pair of vibrators (38, 39). The pair of vibrators (38, 39) are driven by a driving signal from the driving signal supplying circuit (59, 60), the amplitude of the driving signal being selected to be smaller than that of a driving signal used in a case where there are periodically repeated a state in which both of the infrared ray transmitting portions (34, 35) of the pair of opposing members (32, 33) are completely opened and a state in which those are completely blocked, subject to no change in an ambient temperature.

8 Claims, 16 Drawing Figures

FIRST VIBRATION TERMINAL
SECOND VIBRATION TERMINAL
FIRST VIBRATION TERMINAL

INFRARED RAY DETECTOR

BACKGROUND OF THE INVENTION

1. Field of the Invention

The present invention relates to an infrared ray detector and more particularly, relates to an infrared ray detector for detecting, e.g., the temperature of a portion to be detected by infrared rays.

2. Description of the Prior Art

Figure 1A:
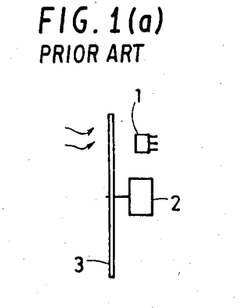
FIGS. 1a and 1b are a side elevational view and a plan view of a conventional infrared ray detecting mechanism, respectively.
Figure 1B:
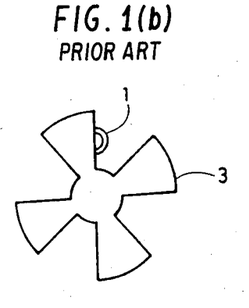

FIGS. 1a and 1b show a side elevational view and a plan view of a conventional infrared ray detecting mechanism, respectively. In FIGS. 1a and 1b, a conventional infrared ray detector 1 contains an infrared ray detecting member of, e.g., a pyroelectric type. Such an infrared ray detecting member has a characteristic of generating electric charges based on changes in the amount of incident infrared rays, and the more the changes in the amount of the incident infrared rays are periodic, the more accuracy of detection by the infrared ray detecting member is improved. Accordingly, it is necessary to periodically change the amount of the infrared rays incident upon the infrared ray detecting member, and, to this end, arranged in front of the infrared ray detector 1 is a metal chopper 3 which is periodically driven to rotate by a synchronous motor 2. Thus, when infrared rays from the portion to be detected (not shown) and infrared rays from the chopper 3 alternately and periodically enter the infrared ray detecting member by rotation of the chopper 3, the infrared ray detecting member generates electric charges with the amount of incident infrared rays being periodically changed. Such electric charges are utilized for measuring the temperature of the portion to be detected.

However, in the structure as described in the foregoing, the motor 2 and the chopper 3 are considerably largely formed, and hence, the space for the infrared ray detecting mechanism itself becomes larger.

Figure 2:
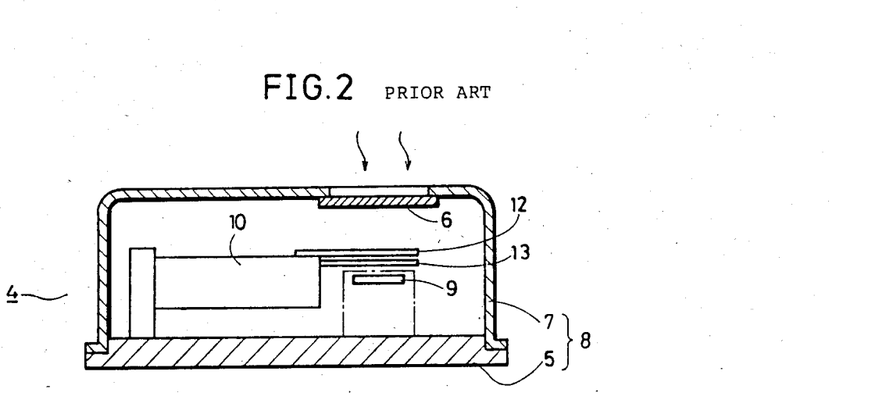
FIG. 2 is a sectional view of an improved conventional infrared ray detector.

FIG. 2 shows a sectional view of an example of a conventional infrared ray detector which is formed to a smaller sized shape. Such infrared ray detector is disclosed in U.S. application Ser. No. 407,582 filed Aug. 12, 1982 now U.S. Pat. No. 4,485,305, by Kenichi Shibata et al. Such an infrared ray detector 4 is in the form of a small rectangular parallelepiped with external sizes of length, width and height of about 24 mm, 15 mm and 15 mm respectively, and contains a novel chopper mechanism. As a result, no provision of the motor 2 and chopper 3 is required, so that the space for an infrared ray detecting mechanism is reduced.

Figure 3:
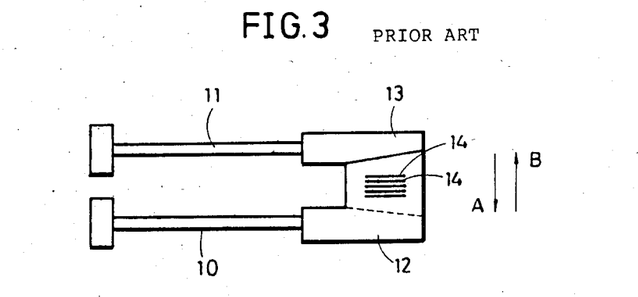
FIG. 3 is a plan view of a chopper mechanism of the infrared ray detector shown in FIG. 2.

In addition, FIG. 3 is a plan view of an essential portion of the infrared ray detector 4 as shown in FIG. 2.

Referring to FIGS. 2 and 3, specific structure of the infrared ray detector 4 will be described in the following. In FIG. 2, in the interior of an outer case 8 consisting of a cap 7 having a header 5 of metal and an infrared ray transmitting portion 6, there are provided a pyroelectric type infrared ray detecting member 9 for generating electric charges based on changes in the amount of incident infrared rays and a chopper mechanism for changing the amount of the infrared rays incident upon the detecting member. The chopper mechanism, as shown in FIG. 3, comprises a pair of piezoelectric vibrating members 10 and 11 and a pair of opposing members 12 and 13 which are fixed to the respective ends of the vibrating members. Such opposing members 12 and 13 are respectively provided with a plurality of slits 14, 14 . . . which are identical in shape and size with each other for respectively transmitting the infrared rays.

If and when a driving signal is applied to a pair of piezoelectric vibrating members 10 and 11, the vibrating members 10 and 11 periodically vibrate mutually in opposite directions (directions A or B), whereby relative positional relation between the opposing members 12 and 13 is periodically changed accompanied by repetition of a state in which the respective slits 14, 14 . . . of the opposing members 12 and 13 are superposed to be most opened, i.e., to be completely opened and a state in which the respective slits 14, 14 are not superposed to be most blocked, i.e., to be completely blocked. Then, with the slits 14, 14 being superposed with each other, the infrared rays from a portion (not shown) to be detected enter the infrared ray detecting member 9 through the infrared ray transmitting portion 6 of the case 8 and the slits 14, 14 . . . of the opposing members 12 and 13 while, in the non-superposed state, only the infrared rays from the opposing members 12 and 13 enter the infrared ray detecting member 9. As a result, the amount of incident infrared rays to the infrared ray detecting member 9 periodically changes and the detecting member 9 generates electric charges used, e.g., for measuring the temperature of the portion to be detected.

In the above infrared ray detector 4, the vibrating members 10 and 11 are influenced by the ambient temperature to be deflected in the direction A or B due to the change in the ambient temperature. When the relative positional relation between the opposing members 12 and 13 in a steady state, i.e., in a non-vibrating state is changed by such deflection, no repetition of the states in which the slits 14, 14 . . . are completely superposed and the same are not in the least superposed is carried out upon vibration. As a result, the change in the amount of infrared rays incident upon the infrared ray detecting member 9 is decreased and thus the amount of the electric charges generated by the infrared ray detecting member 9 is decreased, leading to incorrect measurement of the temperature.

Consequently, it is necessary to make the relative positional relation between the opposing members 12 and 13 upon non-vibration not changed even if the ambient temperature is changed. There are two methods in this regard.

In a first method, previous study is made as to whether the vibrating members 10 and 11 are deflected in the direction A or in the direction B with respect to the change in the ambient temperature to arrange the vibrating members 10 and 11 for making the same deflected in the same direction, with the vibrating members 10 and 11 selected to be in the same structure and to have substantially same temperature coefficients in fine individual changes in the temperature coefficients. Consequently, the vibrating members 10 and 11 are deflected in the same direction substantially in the same amounts with respect to the change in the ambient temperature, whereby the relative positional relation between the opposing members 12 and 13 is not substantially changed.

In a second method, then, optimum bias signals are applied to the respective vibrating members 10 and 11 for supplying the respective vibrating members 10 and 11 with deflection in opposite directions to and in the same amount with the deflection that may be caused by the change in the ambient temperature. Consequently, the deflection of the respective vibrating members 10 and 11 that may be caused by the change in the ambient temperature is cancelled, whereby the relative positional relation between the opposing members 12 and 13 is not changed in the least.

However, in the former case, it is considerably difficult to select the vibrating members 10 and 11 to have substantially identical temperature coefficients, while in the latter case, it is considerably difficult to find out the optimum bias signals.

SUMMARY OF THE INVENTION

Briefly stated, the present invention comprises an infrared ray detecting member for generating electric charges in response to changes in the amount of incident infrared rays; a pair of opposing members disposed in the area of incidence of infrared ray to the infrared ray detecting body and each having a plurality of infrared ray transmitting portions and infrared ray non-transmitting portions; vibrating member for vibrating at least one of said pair of opposing members; and driving signal supplying means for supplying a driving signal for driving said vibrating member so that the relative positional relation between said pair of opposing members is periodically displaced. The amplitude value of the driving signal is selected to be smaller than that of a driving signal employed in a case where there are periodically repeated a state in which the infrared ray transmitting portions of the opposing members are completely superposed to be most opened and a state in which the infrared ray transmitting portions of one opposing member and the infrared ray non-transmitting portions of the other opposing member are completely superposed whereby the infrared ray transmitting portions are most blocked or closed, subject to no influence of an ambient temperature.

In accordance with the present invention, the change in the amount of infrared rays entering into the infrared ray detecting member is not decreased even if the ambient temperature changes, since the amplitude of a driving signal for driving vibrating members is selected such that the difference between a state in which the infrared ray transmitting portions are opened and a state in which the infrared ray transmitting portions are closed when there is no influence of the ambient temperature, is substantially equal to the difference when there is some influence of the ambient temperature.

Accordingly, a primary object of the present invention is to provide an infrared ray detector capable of precisely measuring a temperature, irrespective of change in the ambient temperature.

A main advantage of the present invention is that for the purpose of measuring a precise temperature, only adjustment of amplitude of a driving signal is required and no other specific measure is required for preventing the change of the relative positional relation of a pair of opposing members due to change in the ambient temperature.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
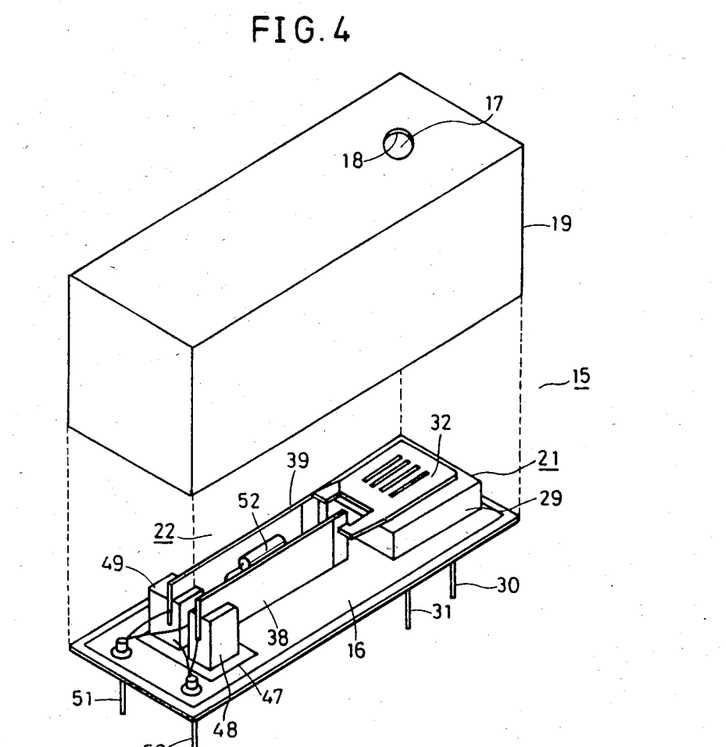
FIG. 4 is an exploded perspective view of an embodiment of the present invention.
Figure 5:
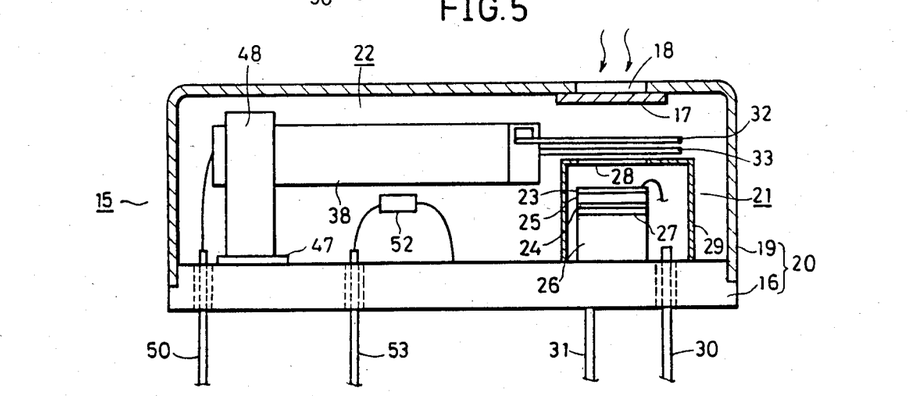
FIG. 5 is a sectional view of an embodiment of the present invention.

FIG. 4 is an exploded, perspective view of an infrared ray detector of an embodiment of the present invention and FIG. 5 is a sectional view thereof.

Referring to FIGS. 4 and 5, in the interior of an outer case 20 comprising a header 16 made of metal and a cap 19 having an infrared ray incident port 18 blocked by an infrared ray transmitting filter 17, there are arranged an infrared ray detecting portion 21 and a chopper mechanism portion 22.

In the infrared ray detecting portion 21, there is provided a pyroelectric type infrared ray detecting member 25 having front and back electrodes 23 and 24 and comprising a single crystal of lithium tantalate ($LiTaO_3$) for generating electric charges in response to changes in the amount of incident infrared rays, and the detecting member is bound and fixed by a conductive binder 27 onto a support member 26 made of metal such as phosphor bronze. The above infrared ray detecting member 25 is shielded with respect to external noises by a shielding member 29 having an infrared ray incident port 28. Further, the front electrode 23 electrically communicates through an impedance transformation circuit (hereinafter described) with a signal terminal 30 embedded in the header 16 through insulating material, while the back electrode 24 electrically communicates through the binder 27, the support member 26 and the header 16 with an earth terminal 31.

Figure 6A:
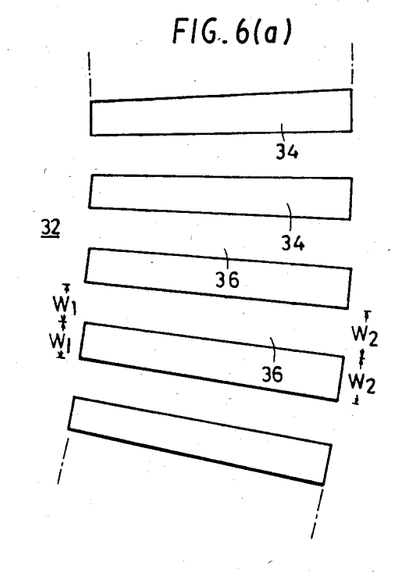
FIGS. 6a and 6b are plan views of first and second opposing members, respectively.
Figure 6B:
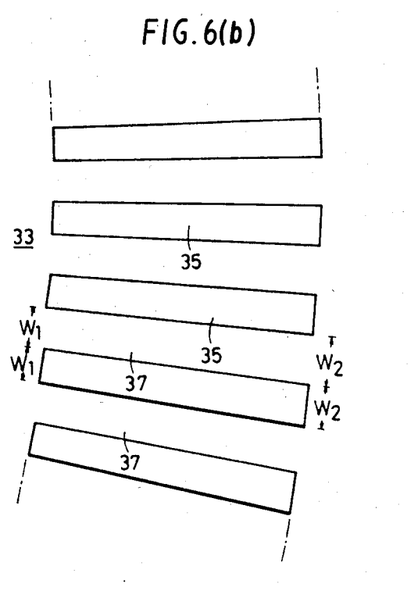

With respect to the chopper mechanism portion 22, there are provided a pair of flat-faced first and second opposing members 32 and 33 arranged in parallel with each other in the area of incidence of the infrared rays on the detecting member 25, i.e., between the detecting member 25 and the port 18. As respectively shown in FIGS. 6a and 6b, the first and second opposing members 32 and 33 are made of infrared ray non-transmitting material such as aluminum and are provided with a plurality of sectorially extending slit-shaped infrared ray transmitting portions 34 and 35 with infrared ray non-transmitting portions 36 and 37 respectively positioned between each adjacent transmitting portions. Both of the transmitting portions 34 and 35 and the non-transmitting portions 36 and 37 are identical to each other in size and shape, with width W1 and W2 being 100 μm and 200 μm respectively.

Figure 7:
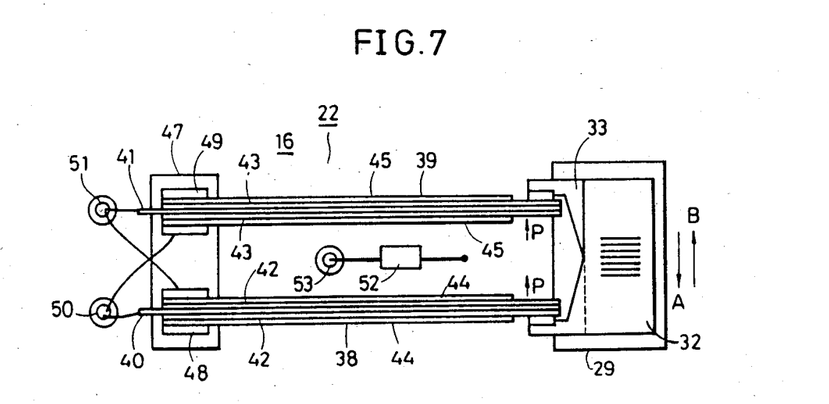
FIG. 7 is a plan view of an essential part of an embodiment of the present invention.

The first and second opposing members 32 and 33 are respectively fixed to the right ends of first and second vibrating members 38 and 39. Now, referring to FIG. 7, there is shown a plan view of the chopper mechanism portion 22. In FIG. 7, the first and second vibrating members are provided with central electrodes 40 and 41 made of phosphor bronze or the like, and on both sides of each of the central electrodes 40 and 41, piezoelectric members 42 and 43 made of barium titanate, lead titanate zirconate and polarized in a single direction (shown by arrow p) are provided to be polarized in the same direction, with front electrodes 44 and 45 made of silver etc. formed on the outer surfaces of the respective piezoelectric members 42 and 43.

The first and second vibrating members 38 and 39 are held and secured by first and second metal fixed members 48 and 49 which are fixed onto the header 16 through an insulating layer 47. In this case, the first and second fixed members 48 and 49 are in electrical contact with the front electrodes 44 and 45. The central electrode 40 of the first vibrating member 38 and the second fixed member 49 are connected to a first vibrating terminal 50 which is embedded in the header 16 through insulating material, while the central electrode 41 of the second vibrating member 39 and the first fixed member 48 are connected to a second vibrating terminal 51 which is also embedded in the header 16 through the insulating material.

With respect to potential difference between the first and second vibrating terminals 50 and 51, +V volts (the first vibrating terminal 50 is higher in voltage than the second vibrating terminal 51) and −V volts (the second vibrating terminal 51 is higher in voltage than the first vibrating terminal 50) are repeated periodically (frequency: 3 Hz) by turns. In the case of the latter potential difference, the lower piezoelectric member 42 (in FIG. 7) is contracted while simultaneously the upper piezoelectric member 42 is expanded in the first vibrating member 38, whereby the first vibrating member 38 is deflected in the direction shown by the arrow A. In the second vibrating member 39, the lower piezoelectric member 43 is expanded while simultaneously the upper piezoelectric member 43 is contracted, whereby the second vibrating member 39 is deflected in the direction B. On the other hand, in the case of the former potential difference, the first and second vibrating members 38 and 39 are deflected respectively in the directions B and A contrarily to the above.

Consequently, the first and second vibrating members 38 and 39 periodically vibrate in directions reverse to each other, and based on such vibration, the first and second opposing members 32 and 33 are displaced in relative positional relation so as to periodically repeat a state in which the infrared ray transmitting portions 34 and 35 of the opposing members 32 and 33 are superposed with each other and a state in which the infrared ray transmitting portions 34 of the first opposing member 32 and the infrared ray non-transmitting portions 37 of the second opposing member 33 are superposed with each other (this is also a state in which the infrared ray non-transmitting portions 36 of the first opposing member 32 and the infrared ray transmitting portions 35 of the second opposing member 33 are superposed with each other). Then, the amount of the infrared rays incident upon the infrared ray detecting member 25 is changed based on the infrared rays from an object to be detected transmitted through a filter 17 to enter the outer case 20 and the infrared rays from the opposing members 32 and 33, whereby the infrared ray detecting member 25 generates electric charges in compliance with the temperature of the object to be detected, and in further detail, a signal corresponding to the temperature difference between the object to be detected and the opposing members 32 and 33.

Further contained in the outer case 20 is a temperature measuring diode 52 for detecting the temperatures of the opposing members 32 and 33. The anode of the diode is connected to a diode terminal 53 embedded in the header 16 through insulating material, and the cathode thereof is grounded.

Figure 8:
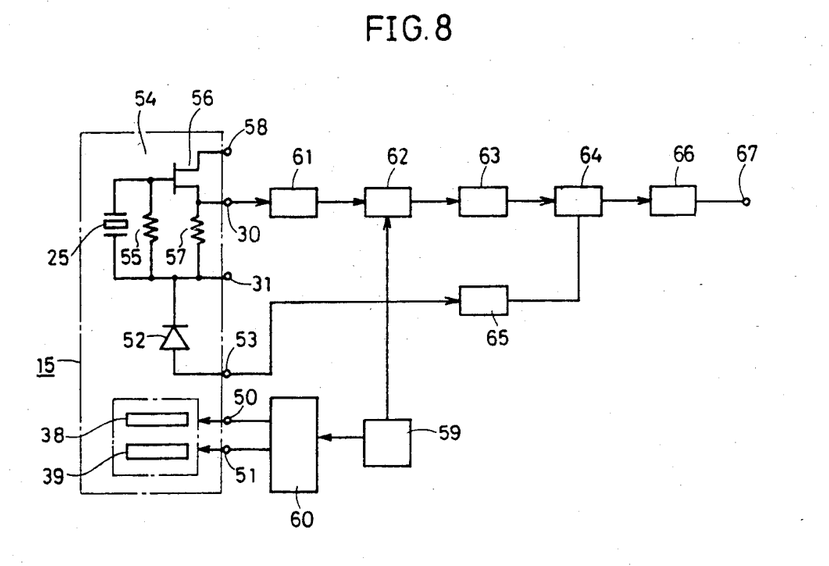
FIG. 8 is a schematic block diagram of an embodiment of the present invention.

Referring to FIG. 8, there is shown a schematic block diagram of one embodiment of the present invention. The front electrode 23 of the infrared ray detecting member 25 is connected to an impedance transformation circuit 54 which is provided in the shielding member 29 with the infrared ray detecting member 25. The transformation circuit comprise a high input resistance 55 of $10^{10}$ to $10^{11}$ $\Omega$, an FET 56 and an output resistance 57 of about 10 k$\Omega$, and the source of the FET 56 is connected to the signal terminal 30 while the drain thereof is connected to a direct current voltage application terminal 58.

Figure 9:
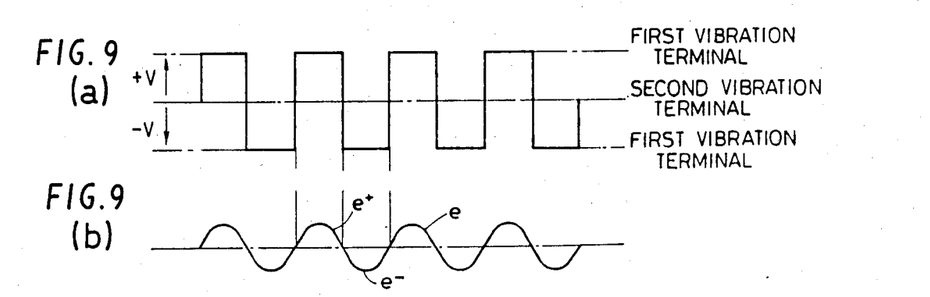
FIG. 9 is waveforms for explaining an operation of one embodiment of the present invention.

FIG. 9a is a waveform representing a driving signal applied between the first and second vibration terminals 50 and 51. The outputs from an oscillator 59 are amplified through an amplification circuit 60, so that the potential differences of $\pm V$ volts, as shown in FIG. 9a, are alternately applied, as a driving signal, between the first and second vibration terminals 50 and 51. By virtue of this, the first and second vibrators 38 and 39 vibrate as hereinabove described, and at the time of such vibration, a signal corresponding to the temperature difference between the object to be detected and the opposing members 32 and 33 is extracted through the impedance transformation circuit 54 from the signal terminal 30 outwardly from the detector 15. FIG. 9b is a waveform of a signal outputted from the detector 15. Such a signal forms an alternate current e as shown in FIG. 9b, whose amplitude corresponds to the temperature difference. And, the signal from the signal terminal 30 is inputted through a filter amplifier 61 into a synchronous detector 62.

Such a detector 62 synchronizes the alternate current signal e with the output from the oscillator 59, so as to detect and output, in case where the temperature of the object to be detected is higher than the temperatures of the opposing members 32 and 33, a positive direct current signal corresponding to the temperature difference therebetween, and to detect and output, in case where the temperature of the object to be detected is lower than the temperatures of the opposing members 32 and 33, a negative direct current signal corresponding to the temperature difference therebetween. More particularly, a portion of a positive half cycle e+ coincides with the portion corresponding to the potential difference of +V volts in the outputs from the oscillator 59 when the temperature of the object to be detected is higher than the temperatures of the opposing members 32 and 33, while a portion of a negative half cycle e− coincides with the portion corresponding to the potential difference of +V volts in the output from the oscillator 59 when the temperature of the object to be detected is lower than the temperatures of the opposing members 32 and 33. The detector 62 outputs a positive direct current signal corresponding to the temperature difference between the object to be detected and the opposing members 32 and 33 upon the former coincidence, while it outputs a negative direct current signal corresponding to such temperature difference upon the latter coincidence.

Then, the output from the detector 62 is inputted through a direct current amplifier 63 in a synthesizing circuit 64. Further inputted in the subject synthesizing circuit is the output from the temperature measuring diode 52, i.e., the signal corresponding to the temperatures of the opposing members 32 and 33 through a direct current amplifier 65. The synthesizing circuit 64 adds up these two inputs, to generate a signal corresponding to the actual temperature of the object to be detected. Such an output is led to an output terminal 67 for providing outputs to a desired circuit through a direct current amplifier 66.

Although the first and second vibrators 38 and 39 are so arranged as to be deflected in the same direction upon occurrence of changes in the ambient temperature, they dare not be selected to have substantially identical temperature coefficients. Therefore, in general, there is a difference between the amounts of deflection of the vibrators 38 and 39 with respect to the change in the ambient temperature.

It is assumed here that the specific value of the potential difference of $\pm V$ volts between the first and second vibrating terminals 50 and 51 is $\pm 60$ volts. Assuming that, in this case, there is no change in the ambient temperature whereby no deflection is caused in the vibrators 38 and 39, there are periodically repeated, with respect to relative positional relation between the first and second opposing members 32 and 33, a state in which the infrared ray transmitting portions 34 and 35 of the opposing members 32 and 33 are superposed to be most, i.e., completely opened and a state in which the infrared ray transmitting portions 34 of the first opposing member 32 and the infrared ray non-transmitting portions 37 of the second opposing member 33 are superposed so that the infrared ray transmitting portions 34 and 35 of the opposing members 32 and 33 are most, i.e., completely blocked.

When, in such a condition, the vibrators 38 and 39 are caused to be deflected by changes in the ambient temperature, there rises a difference between the amounts of deflection of the vibrators 38 and 39, whereby there is performed no repetition of the state in which the infrared ray transmitting portions 34 and 35 are completely opened and the state in which the same are completely blocked in the conventional manner, to obstruct correct temperature measurement.

Figure 10:
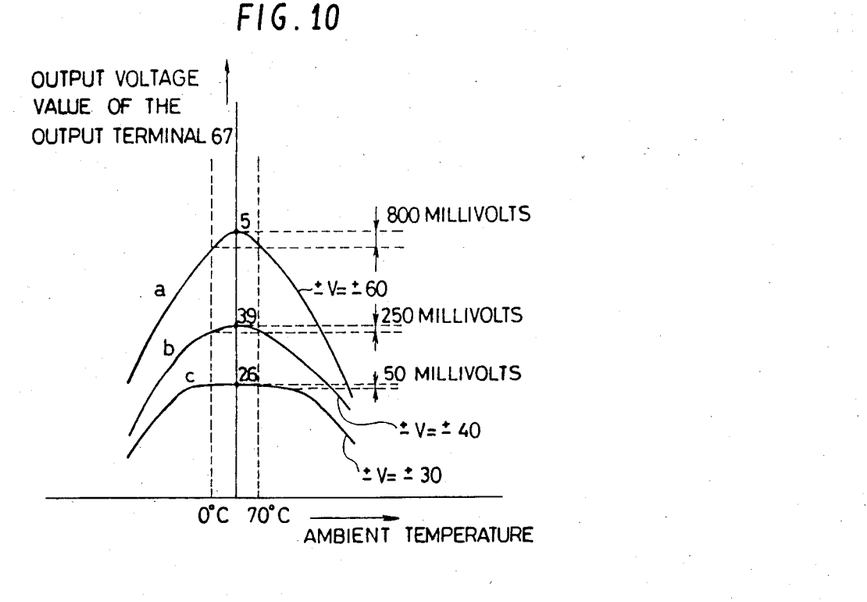
FIG. 10 is a characteristic of an output voltage of an embodiment of the present invention.

Referring to FIG. 10, there is shown an example of a characteristic of output voltage values of the output terminal 67 with respect to the change in ambient temperature.

Assuming that the temperature of the object to be detected is 150° C., the characteristic of the output voltage value of the output terminal 67 with respect to the change in the ambient temperature at that time is specifically expressed as shown by a curve a in FIG. 10. When no deflection is caused by the change in the ambient temperature in the subject curve a, the output voltage comes to a peak value of 5 volts, whereby the correct temperature value of 150° C. is measured from such peak value. On the other hand, when deflection is caused by the change in the ambient temperature, the output voltage value deviates from the peak value such that, when, e.g., the ambient temperature is changed within a range of 0° C. to 70° C., an error of 800 millivolts takes place to obstruct correct temperature measurement.

Let's consider the characteristic of the output voltage value of the output terminal 67 with respect to the change in the ambient temperature under a different condition. Assuming that the value of the potential difference of $\pm V$ volts is, e.g., $\pm 40$ volts, the characteristic is as shown by the curve b in FIG. 10. In this case, the peak value in a state no deflection is caused by the change in the ambient temperature is 3.9 volts (the correct temperature of 150° C. can be measured by this value), and the error is decreased to 250 millivolts in a state that the ambient temperature is changed within a range of 0° C. to 70° C. Further, assuming that the value of the potential difference of $\pm V$ volts is, e.g., $\pm 30$ volts, the characteristic of the output is as shown by the curve c in FIG. 10. In this case, the peak value is 2.6 volts (the correct temperature of 150° C. can be similarly measured by this value) and the error is further decreased to 50 millivolts.

In view of such consequences, it is understood that the error is reduced as the potential difference of $\pm V$ volts between the first and second vibrating terminals 50 and 51, i.e., the amplitude value of V volts (FIG. 9a) of the driving signals for making the first and second vibrators 38 and 39 vibrate becomes the amplitude values of 40 volts and 30 volts which are smaller in comparison with the amplitude value of 60 volts for making repetition of the state for completely opening the infrared ray transmitting portions 34 and 35 and the state for completely blocking the same.

Figures 11, 12:
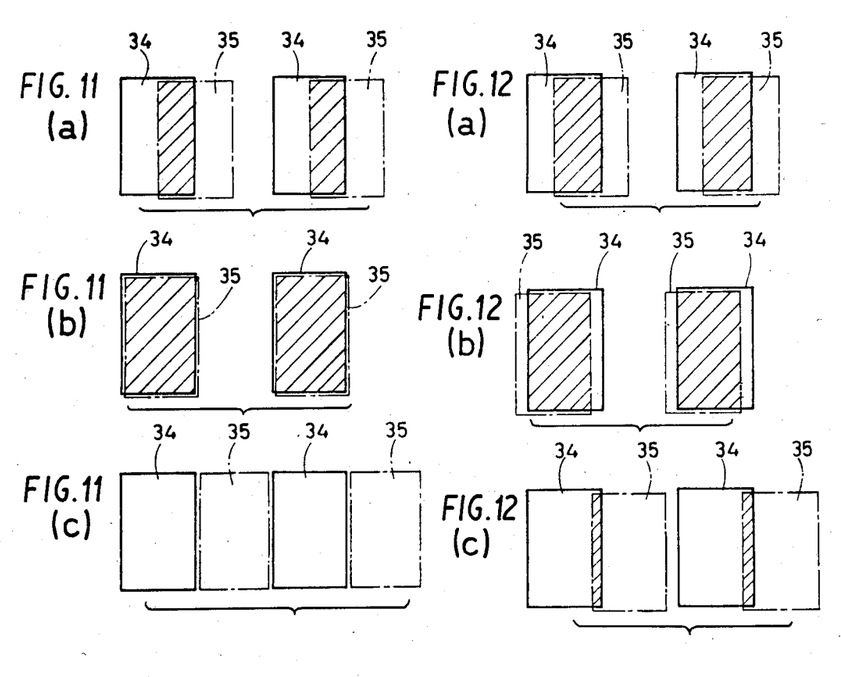
FIGS. 11, 12, 13 and 14 are, respectively, a typical plan views representing relative positional relations of the first and second opposing members.

FIG. 11 is a typical plan view representing a relative positional relation between the first and second opposing members 32 and 33 in a case where no deflection is caused in the vibrators 38 and 39 by the change in the ambient temperature. Particularly, if and when no vibration is caused, the relative positional relation between the opposing members 32 and 33 is as shown in FIG. 11a in positions in which the infrared ray transmitting portions 34 and 35 are superposed and opened by half. It is to be noted that such opened portions are shown by oblique lines in drawings thereafter. When, on the basis of such positional relation, the first and second vibrators 38 and 39 are made to vibrate at the amplitude value of 60 volts, the state in which the infrared ray transmitting portions 34 and 35 are completely opened as shown in FIG. 11b and the state in which the infrared ray transmitting portions 34 and 35 are completely blocked as shown in FIG. 11c are repeated, whereby the amount of change in the infrared rays to the infrared ray detector 25 is maximized.

FIG. 12 is a typical plan view representing the relative positional relation between the first and second opposing members 32 and 33 in a case where the vibrators 38 and 39 are caused to be deflected by the change in the ambient temperature. Particularly, if and when no vibration is caused, the relative positional relation between the opposing members 32 and 33 is as shown in FIG. 12a, which deviates from the positional relation in FIG. 11a. When, on the basis of such positional relation shown in FIG. 12a, the first and second vibrators 38 and 39 are made to vibrate at the amplitude value of 60 volts, the blocked states of the infrared ray transmitting portions 34 and 35 are changed between the states shown in FIGS. 12b and 12c, and in this case, the infrared ray transmitting portions 34 and 35 are not completely blocked though the same are temporarily completely opened. Accordingly, the difference between the opening degrees and the blocking degrees is considerably decreased in comparison with that in the complete opening and blocking, whereby the amount of change in the infrared rays to the detecting member 25 is considerably decreased. Therefore, the error amounting to 800 millivolts is caused in the output voltage.

Figure 13A:
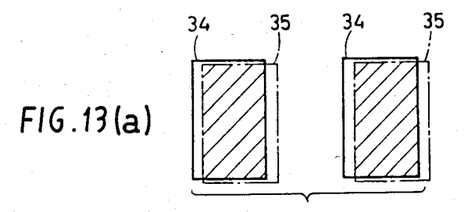
Figure 13B:
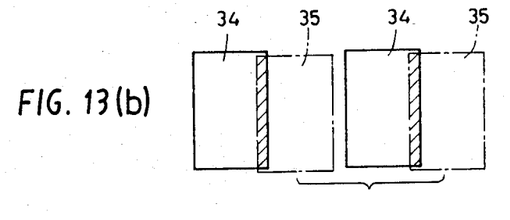
Figure 14A:
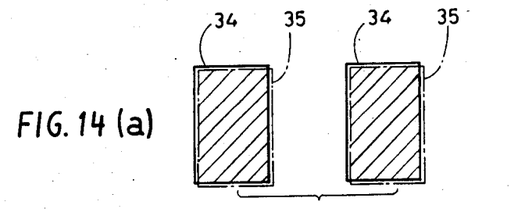
Figure 14B:
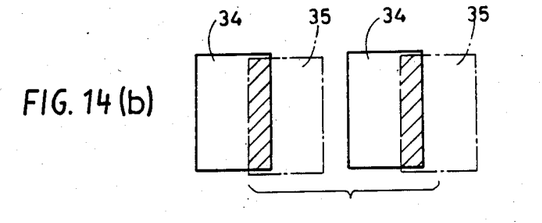

FIG. 13 is a typical plan view representing a relative positional relation between the first and second opposing members 32 and 33, when the vibrators 38 and 39 are made to vibrate at the amplitude value of 30 volts in a state no deflection is caused in the vibrators 38 and 39 by the change in the ambient temperature. In this case, the states of opening and blocking of the infrared ray transmitting portions 34 and 35 are changed between the states in FIGS. 13a and 13b on the basis of the positional relation in FIG. 11a. FIG. 14 is a typical plan view representing a relative positional relation between the first and second opposing members 32 and 33, when the vibrators 38 and 39 are made to vibrate at the amplitude value of 30 volts in a state the vibrators 38 and 39 are caused to be deflected by the change in the ambient temperature. In this case, the states of opening and blocking of the infrared ray transmitting portions 34 and 35 are changed between those in FIGS. 14a and 14b on the basis of the positional relation in FIG. 12a. In this case, the difference between the opening and blocking degrees of the infrared ray transmitting portions 34 and 35 between FIGS. 13a and 13b is substantially identical to the difference in opening and blocking degrees between FIGS. 14a and 14b, whereby the error of the output voltage is reduced to the value of 50 millivolts.

Based on the above consideration, the amplification circuit 60 is adjusted such that, assuming that the potential difference of $\pm V$ volts between the aforementioned vibrating terminals 50 and 51, i.e., the amplitude value of the driving signals for making the vibrators 38 and 39 vibrate is V volts, the small amplitude value of 30 volts is selected and outputted with respect to the amplitude of 60 volts in a case where there are repeated the state in which the infrared ray transmitting portions 34 and 35 are completely opened and the state in which the same are completely blocked. Consequently, the error caused by the change in the ambient temperature is reduced to enable correct temperature measurement. Our experiment indicates that under condition in which vibrators 38, 39 are not driven and are not subjected to influence of the ambient temperature and each of the infrared ray transmitting portions 34, 35 is half blocked, the value of the voltage difference $\pm V$ volts is preferably selected as the value of $\pm 15$ volts to $\pm 42$ volts, in which case the error in the output voltage is preferably minimized. Furthermore, if and when the value of $\pm V$ volts is selected as the value of $\pm 15$ volts to $\pm 42$ volts, there are periodically repeated a state in which 25% through 70% of the blocked area of the infrared ray transmitting portions is further opened and a state in which 25% through 70% of the opened area of the infrared ray transmitting portions is further blocked. In addition, our experiment further indicates that the error in the output voltage is further preferably minimized when the value of the voltage difference ($\pm V$ volts) is selected as the value of $\pm 27$ volts to $\pm 33$ volts, in which case there are periodically repeated a state in which 45% through 55% of the blocked area of the infrared ray transmitting portions is further opened and a state in which 45% through 55% of the opened area of the infrared ray transmitting portions is further blocked. Although the level of the output voltage value of the output terminal 67 is simultaneously lowered as hereinabove described, such lowering is not significant in comparison with the excellent effect obtained by the aforementioned reduction of the error.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An infrared ray detector comprising:
   an infrared ray detecting member for generating electric charges in response to changes in the amount of incident infrared rays;
   a pair of opposing members disposed in the area of incidence of infrared rays on said detecting member, each having a plurality of infrared ray transmitting portions and infrared ray non-transmitting portions;
   a vibrator for vibrating at least one of said pair of opposing members; and
   driving signal supplying means supplying a driving signal for driving said vibrator so that relative positional relation between said pair of opposing members is periodically changed;
   wherein the amplitude of said driving signal is selected to be smaller than the maximum amplitude of a driving signal employed in a case where there are periodically repeated a first state in which said infrared ray transmitting portions of said opposing members are completely overlapped to be most opened and a second state in which said infrared ray transmitting portions of one opposing member and said infrared ray non-transmitting portions of the other opposing member are completely overlapped whereby said infrared ray transmitting portions are most blocked, in changing said relative positional relation between said opposing members.

2. An infrared ray detector in accordance with claim 1, wherein
   each of said infrared ray transmitting portions and said infrared ray non-transmitting portions is of a stripe like and generally rectangular shape,
   the relative positional relation between said pair of opposing members is displaced in a lateral direction of said infrared ray transmitting portions and said infrared ray non-transmitting portions, and
   said pair of opposing members are disposed in the area of incidence of infrared rays on said detecting member with each of said infrared ray transmitting portions of said pair of opposing members being blocked ih a half area of the lateral direction when said vibrator is not driven, in a case where said first state and said second state are periodically repeated if when a driving signal of said maximum amplitude is employed.

3. An infrared ray detector in accordance with claim 1, wherein
   said infrared ray detecting member is of a pyroelectric type.

4. An infrared ray detector in accordance with claim 1, wherein
   said driving signal is a rectangular wave signal.

5. An infrared ray detector in accordance with claim 1, wherein
   said vibrator is a piezoelectric member.

6. An infrared ray detector in accordance with claim 1, wherein
said pair of opposing members are disposed in the area of incidence of infrared rays on said detecting member with each of said infrared ray transmitting portions of said pair of opposing members being half blocked when said vibrator is not driven, in case where said first state and said second state are periodically repeated if and when a driving signal of said maximum amplitude is employed.

7. An infrared ray detector in accordance with claim 1, wherein
said pair of opposing members are disposed in the area of incidence of infrared rays on said detecting member with each of said infrared ray transmitting portions of said pair of opposing members being half blocked when said vibrator is not driven, in case where said first state and said second state are periodically repeated if and when a driving signal of said maximum amplitude is employed, and
the amplitude of said driving signal is selected such that there are periodically repeated a state in which 25% through 70% of the blocked area of said infrared ray transmitting portions is further opened and a state in which 25% through 70% of the opened area of said infrared ray transmitting portions is further blocked.

8. An infrared ray detector in accordance with claim 1, wherein
said pair of opposing members are disposed in the area of incidence of infrared rays on said detecting member with each of said infrared ray transmitting portions of said pair of opposing members being half blocked when said vibrator is not driven, in case where said first state and said second state are periodically repeated if and when a driving signal of said maximum amplitude is employed, and
the amplitude of said driving signal is selected such that there are periodically repeated a state in which 45% through 55% of the blocked area of said infrared ray transmitting portions is further opened and a state in which 45% through 55% of the opened area of said infrared ray transmitting portions is further blocked.

* * * * *